United States Patent
Velez et al.

(10) Patent No.: US 11,005,515 B2
(45) Date of Patent: May 11, 2021

(54) TRANSPARENT ACCESSORY CASE FOR AN ELECTRONIC DEVICE

(71) Applicant: Apple Inc., Cupertino, CA (US)

(72) Inventors: Michael B. Velez, Sunnyvale, CA (US); Colin M. Wang, Mountain View, CA (US); Stephen T. Schooley, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/361,176

(22) Filed: Mar. 21, 2019

(65) Prior Publication Data

US 2020/0083920 A1    Mar. 12, 2020

Related U.S. Application Data (60) Provisional application No. 62/729,378, filed on Sep. 10, 2018.

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0283* (2013.01)

(58) Field of Classification Search
CPC .............. H04B 1/3888; H04M 1/0283; H04M 1/0249; H04M 1/0268; H05K 5/0086; H05K 5/0017
USPC ................................ 455/575.8, 575.1, 556.2
See application file for complete search history.

(56) References Cited

U.S. PATENT DOCUMENTS

| | | | |
|---|---|---|---|
| 6,926,141 | B2 | 8/2005 | Montler |
| 9,872,546 | B2 | 1/2018 | Kim |
| 2016/0142522 | A1 | 5/2016 | Kim |
| 2017/0013925 | A1 | 1/2017 | Fathollahi et al. |
| 2017/0049000 | A1 | 2/2017 | Kang et al. |

FOREIGN PATENT DOCUMENTS

| | | |
|---|---|---|
| CN | 206433047 U | 8/2017 |
| CN | 107707699 A | 2/2018 |
| CN | 207460294 U | 6/2018 |
| KR | 20150144221 A | 12/2015 |

OTHER PUBLICATIONS

Chinese Patent Application No. 201910423456.1—First Office Action dated Aug. 18, 2020.

*Primary Examiner* — Danh C Le (74) *Attorney, Agent, or Firm* — Dickinson Wright RLLP (57) ABSTRACT

An accessory device for an electronic device is disclosed. The accessory device may be formed from one or more transparent materials. The accessory device may include a first transparent material coupled to a second transparent material. The first transparent material may provide a rigid structural base, while the second transparent material provides flexibility to depress buttons of the electronic device. An oleophobic coating may be applied to the outer perimeter of the accessory device in order to resist residue build-up. Also, the accessory device may include a camera opening for a camera of the electronic device. The accessory device may be raised around the camera opening, both on an internal and external surface of the accessory device. The surface defining the camera opening may undergo a polishing operation in order to increase light transmission through the transparent materials that form the accessory device.

12 Claims, 7 Drawing Sheets

TRANSPARENT ACCESSORY CASE FOR AN ELECTRONIC DEVICE

CROSS-REFERENCE TO RELATED APPLICATION(S)

This application claims the benefit of priority to U.S. Provisional Application No. 62/729,378, filed on Sep. 10, 2018, titled "TRANSPARENT ACCESSORY CASE FOR AN ELECTRONIC DEVICE," the disclosures of which are incorporated herein by reference in their entirety.

FIELD

The following description relates to accessory devices for use with electronic devices. In particular, the following description relates to accessory device formed from transparent materials. Some transparent materials may provide flexible properties that facilitate insertion/extraction of the electronic device, while transparent materials may provide rigid properties that protect the electronic device.

BACKGROUND

Accessory devices may include protective cases or covers for electronic devices. An accessory devices is designed to protect the housing of the electronic device.

SUMMARY

In one aspect, an accessory device for an electronic device is described. The accessory device may include a back wall formed from a first transparent material. The accessory device may further include sidewalls that extend from the back wall. The sidewalls can be formed from the first transparent material and a second transparent material different from the first transparent material. In some instances, the sidewalls include a sidewall that includes a through hole formed in the first transparent material. Also, in some instances, the second transparent material covers the through hole and defines a protrusion at a location corresponding to the through hole. The location may correspond to a button of the electronic device.

In another aspect, an accessory device for an electronic device is described. The accessory device may include a transparent back wall that includes a through hole. The transparent back wall further may further include a raised region that surrounds the through hole. The raised region may extend beyond a surface defined by the transparent back wall. The accessory device may further include transparent sidewalls extending from the transparent back wall. In some instances, the sidewalls engage the electronic device such that the electronic device lacks contact with the back wall.

In another aspect, a method for forming an accessory device for an electronic device is described. The method may include forming a back wall from a first transparent material. The method may further include forming sidewalls that extend from the back wall. The sidewalls can be formed from the first transparent material and a second transparent material different from the first transparent material. The method may further include covering an outer perimeter with a third transparent material. In some instances, the back wall and the sidewalls define the outer perimeter.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices for use with electronic devices, such as portable electronic device including mobile wireless communication devices (also known as smartphones) and tablet computer devices. In particular, accessory devices described herein are used to provide a protective outer body for electronic devices, while also providing an aesthetic finish. Accessory devices described herein may be referred to as accessories, accessory cases, cases, protective cases, or covers.

In several described embodiments, an accessory device may include transparent, or optically clear, materials. For example, the accessory device may include a first transparent material, such as a transparent polycarbonate, that forms a base. The first transparent material may extend from the base to form, or at least partially form, several sidewalls designed to engage the electronic device. The accessory device may further include a second transparent material, such as a transparent thermoplastic polyurethane, that covers (or at least partially covers) the first transparent material and forms an additional section of the sidewalls. By providing an accessory device with transparent materials, the aesthetics of an electronic device (including the color and finish) are not hidden or obscured, as compared to accessory devices with an opaque material (or materials).

The first transparent material may provide a relatively rigid structure (as compared to the second transparent material). In this regard, the first transparent material can provide structural support and added protection for an electronic device positioned in the accessory device. The second transparent material may provide a flexible structure (as compared to the first transparent material) designed to plastically bend with respect to the first transparent material. Further, the second transparent material may form a button capable of passing through an opening of the first transparent material. The button on the second transparent material may be depressed by a user in order to depress a button of the electronic device.

The accessory device may include additional features. For example, the accessory device may include a camera opening for a camera of the electronic device. The camera opening may be formed in a back wall of the accessory device. The surface that defines the camera opening may undergo a polishing operation designed to increase the light transmission properties of the accessory device along the camera opening. This allows light generated from a camera flash of the electronic device to more freely pass through the transparent materials of the accessory device, rather than reflect back into the camera. Moreover, the accessory device may be raised in locations surrounding the camera opening, both internally and externally. This provides added protection to the camera. Also, at least one of the raised locations may undergo one or more processes to promote insertion of the electronic device into the accessory device.

The accessory device may be sized in a manner that causes the electronic device, when engaged with the sidewalls of the electronic device, to be suspended from the back wall of the accessory device. Accordingly, the electronic device may be separated from, or not in contact with, the back wall, based on the size of the accessory device. Also, the accessory device may further include a hard or rigid coating that covers the outer perimeter of the electronic device. The coating may include oleophobic properties designed to resist build-up of contaminants and other debris, as well as liquid.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
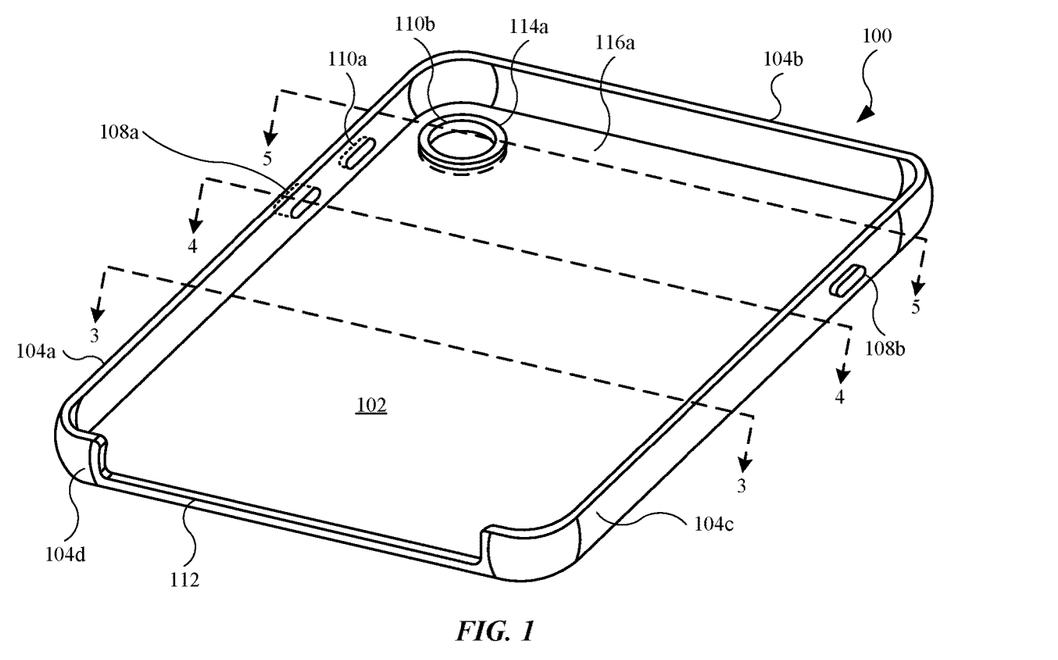
FIG. 1 illustrates an isometric front view of an embodiment of an accessory device, in accordance with some described embodiments.

FIG. 1 illustrates an isometric front view of an embodiment of an accessory device 100, in accordance with some described embodiments. The accessory device 100 may be referred to an accessory case, a case, a protective case, or the like. The accessory device 100 is designed to receive an electronic device (not shown in FIG. 1), including a portable electronic device such as a mobile wireless communication device or a tablet computer device.

The accessory device 100 may include a wall 102. The wall 102 may be referred to as a bottom wall or a back wall of the accessory device 100. The accessory device 100 may further include several sidewalls that extend from the wall 102 to engage, surround, and protect the electronic device. As shown, the accessory device 100 may include a sidewall 104a, a sidewall 104b, a sidewall 104c, and a sidewall 104d. The aforementioned sidewalls may be referred to as retaining walls, and may combine with the wall 102 to define an internal volume (not labeled) that receives the electronic device. This will be shown below.

In some embodiments, the accessory device 100 include opaque materials with one or more features that provide an aesthetic finish to the accessory device 100. In the embodiment shown in FIG. 1, the accessory device 100 includes a transparent accessory device. In other words, the wall 102 and the aforementioned sidewalls may be formed from one or more optically clear materials. This provides the accessory device 100 with a transparent and see-through accessory device. Accordingly, light can substantially pass through the accessory device 100. As a result, a user that carries an electronic device in the accessory device 100 can see through the accessory device 100 when viewing the accessory device 100 through the wall 102 and/or the aforementioned sidewalls. This allows the user to view the aesthetic appearance (such as the color scheme and finish) and other features of the electronic device, even when the electronic device is positioned in the accessory device 100.

In order to interact with the electronic device in the internal volume 106, the accessory device 100 may include several modifications. For example, the sidewall 104a may include a protrusion 108a, or protruding feature, that extends from the sidewall 104a. The protrusion 108a may be positioned along the sidewall 104a in a location corresponding to a button of the electronic device (not shown in FIG. 1). As a result, a depression of the protrusion 108a may provide a depression to the button of the electronic device that generates a command or input. The sidewall 104a may include a through hole 110a, or opening, formed in the sidewall 104a. The through hole 110a may be positioned along the sidewall 104a in a location corresponding to a switch of the electronic device (not shown in FIG. 1). As a result, the switch may protrude through the through hole 110a, thereby allowing a user to actuate the switch and generate a command. The sidewall 104c may also include a protrusion 108b that is positioned along the sidewall 104c in a location corresponding to an additional button of the electronic device. Although the protrusion 108a, the protrusion 108b, and the through hole 110a are shown in specific locations, these features may be located on other sidewalls, and the number of protrusion and through holes may vary in accordance with the number of buttons and switches, respectively, of an electronic device that is compatible with the accessory device 100.

The sidewall 104d may include a cutout region 112 defined by a void or space in the sidewall 104d. The cutout region 112 may allow user access to a data port of an electronic device. When an electronic device is positioned in the accessory device 100, the cutout region 112 may allow acoustical energy (in the form of audible sound) to exit a speaker module of the electronic device, and/or allow acoustical energy to enter a microphone of the electronic device.

The wall 102 may include a through hole 110b in a location corresponding to a camera (not shown in FIG. 1) of the electronic device. The accessory device 100 may further include a raised region 114a that surrounds the through hole 110b. The raised region 114a represents an elevated surface, as compared to a surface 116a defined by the wall 102. The surface 116a may be referred to an internal surface or inner surface of the accessory device 100. The raised region 114a may protect the camera of the electronic device and/or promote insertion of the electronic device into the accessory device 100.

Figure 2:
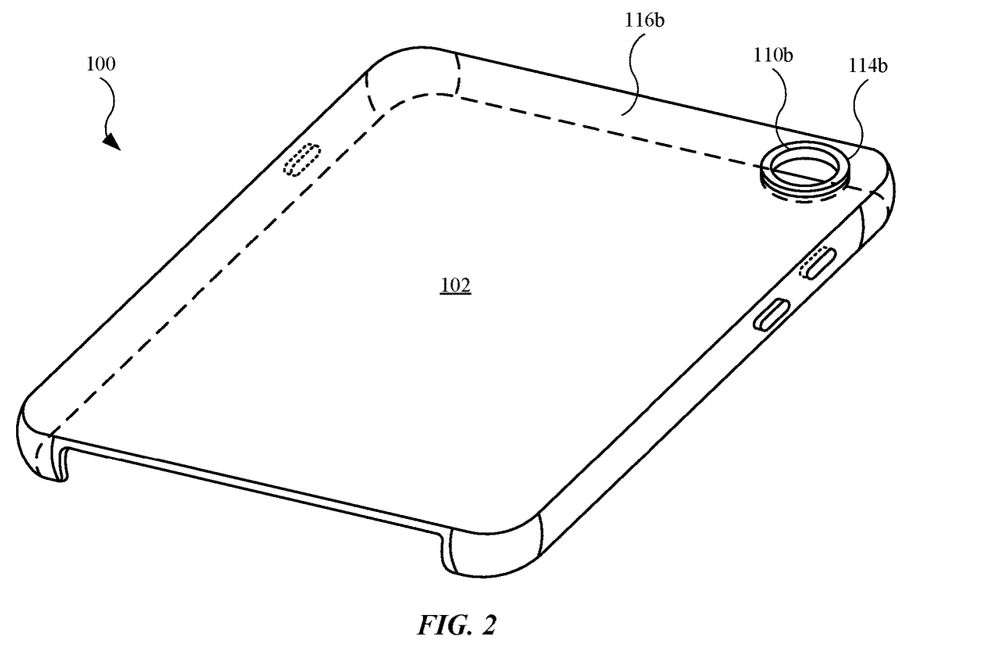
FIG. 2 illustrates an isometric rear view of the accessory device shown in FIG. 1, showing additional features of the accessory device.

FIG. 2 illustrates an isometric rear view of the accessory device 100 shown in FIG. 1, showing additional features of the accessory device 100. As shown, the accessory device 100 may further include a raised region 114b that surrounds the through hole 110b. The raised region 114b represents an elevated surface, as compared to a surface 116b of the wall 102. The surface 116b may be referred to an external surface or outer surface of the accessory device 100. It should be noted that the surface 116b is a surface that is opposite (and generally parallel to) the surface 116a (shown in FIG. 1).

Figure 3:
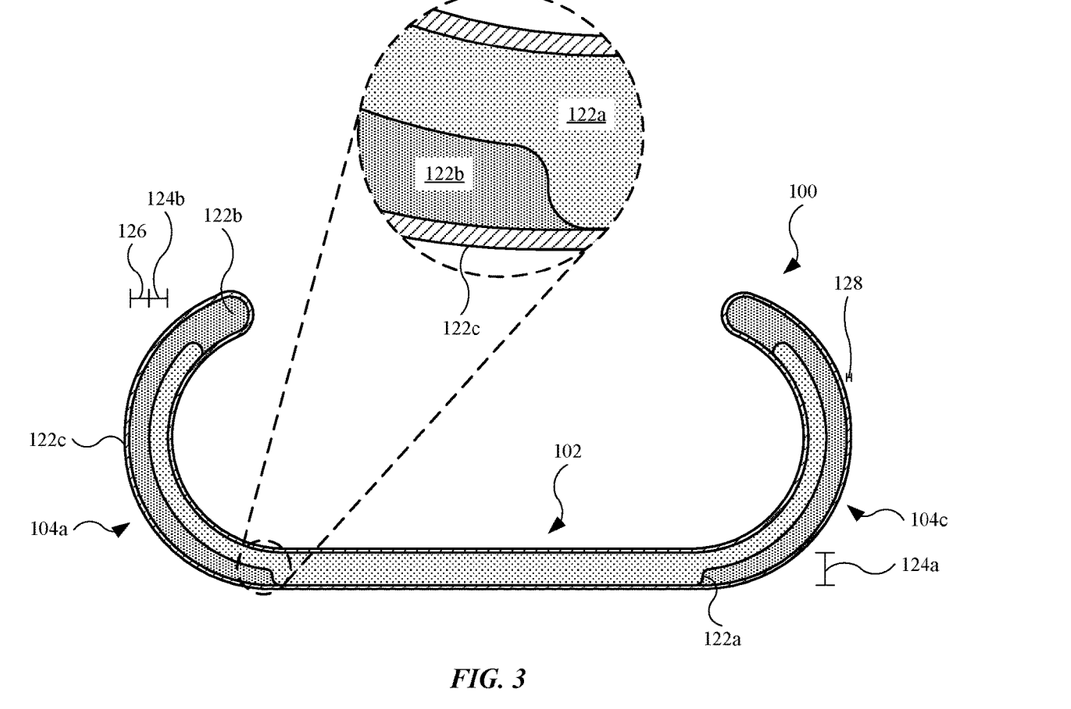
FIG. 3 illustrates a cross sectional view of the accessory device shown in FIG. 1, taken along line 3-3.

FIG. 3 illustrates a cross sectional view of the accessory device 100 shown in FIG. 1, taken along line 3-3. The accessory device 100 may include several transparent materials. For example, the accessory device 100 may include a transparent material 122a. The transparent material 122a may include a transparent polycarbonate material. However, other transparent materials, such as a transparent polymer, plastic, or glass (as non-limiting examples), can be used. The transparent material 122a may extend along the wall 102. The transparent material 122a may also extend, or at least partially extend, along the sidewalls. For example, as shown, the transparent material 122a extends along the sidewall 104a and the sidewall 104c. Although not shown, the transparent material 122a may also extend along the sidewall 104b and the sidewall 104d (both shown in FIG. 1).

The accessory device 100 may further include a transparent material 122b. The transparent material 122b may include a transparent thermoplastic polyurethane material. However, other transparent materials, such as a transparent polymer or silicone (as a non-limiting example), can be used. The transparent material 122b is primarily positioned along the sidewalls, but may partially extend into the wall 102. As shown, the transparent material 122b extends along the sidewall 104a and the sidewall 104c. Although not shown, the transparent material 122b may also extend along the sidewall 104b and the sidewall 104d (both shown in FIG. 1).

The accessory device 100 may further include a transparent material 122c. The transparent material 122c may include an acrylic material. Also, the transparent material 122c may include an oleophobic material designed to resist residue, smudge, liquid, or other contaminants that contact the accessory device 100. The transparent material 122c may undergo a curing process, including ultraviolet ("UV") curing. As a result, the transparent material 122c may include a relatively rigid material, as compared to the transparent material 122b. The transparent material 122c may cover an outer perimeter of the accessory device 100 include the wall 102 and the sidewalls. As shown in the enlarged view, the transparent material 122c surrounds the transparent material 122a and the transparent material 122b. In some instances, the transparent material 122c fully covers the outer perimeter, including the transparent material 122a and the transparent material 122b. In some instances in the detailed description and in the claims, the transparent material 122a, the transparent material 122b, and the transparent material 122c may be referred to as a first transparent material, a second transparent material, and a third transparent material, respectively.

It should be noted that while the transparent material 122a, the transparent material 122b, and the transparent material 122c can be optically clear materials, in some instances (not shown in FIG. 3), at least one of the transparent material 122a, the transparent material 122b, and the transparent material 122c can be altered to alter the light transmission effects. For example, the transparent material 122a, the transparent material 122b, and/or the transparent material 122c may include some pigmentation or other tinting effect to alter the appearance of the accessory device 100, in terms of color and/or light transmission.

The transparent material 122a may include a varying thickness depending upon the location. For example, along the wall 102, the transparent material 122a may include a thickness 124a. The thickness 124a can be approximately in the range of 1.0 to 1.4 millimeters ("mm"). In some embodiments, the thickness 124a is 1.2 mm. Along the sidewalls (including the sidewall 104a and the sidewall 104c, as well as remaining sidewalls shown in FIG. 1), the transparent material 122a may include a thickness 124b. The thickness 124b can be approximately in the range of 0.6 to 1.0 mm. In some embodiments, the thickness 124b is 0.8 mm. Accordingly, the transparent material 122a can transition to a reduction in dimension from the thickness 124a in the wall 102 to the thickness 124b in the sidewalls. Also, along the sidewalls (including the sidewall 104a and the sidewall 104c, as well as remaining sidewalls shown in FIG. 1), the transparent material 122b may include a thickness 126 approximately in the range of 0.6 to 1.0 mm. In some embodiments, the thickness 126 is 0.8 mm. The transparent material 122c may include a thickness 128 approximately in the range of 10 to 30 micrometers ("µm"). In some embodiments, the thickness 128 is 20 µm. Generally, the thickness 128 of the transparent material 122c is consistent in all locations. Also, the thickness 128 of the transparent material 122c is chosen to prevent "welling," or unwanted build-up of the transparent material 122c in certain locations. Further, the thickness 128 of the transparent material 122c is chosen to prevent "orange peel," or unwanted texturing.

Although the accessory device 100 include three different types of materials, the processes or operations used to combine the materials may provide for a seamless transition between the materials. For example, a molding operation, including compression molding or injection molding (as non-limiting examples) can mold the transparent material 122b to the transparent material 122a. However, the molding operation may render indiscernible, by a user of the accessory device 100, a parting line or border between the transparent material 122a and the transparent material 122b. Further, when the transparent material 122c is applied to the transparent material 122a and the transparent material 122b, the parting line or border between the transparent material 122c and a combination of the transparent material 122a and the transparent material 122b may also be indiscernible by a user of the accessory device 100. In other words, in some instances, the accessory device 100 may provide seamless transitions among its transparent materials, and may provide an appearance of a unitary material, as the borders between the materials are not visible.

Figure 4:
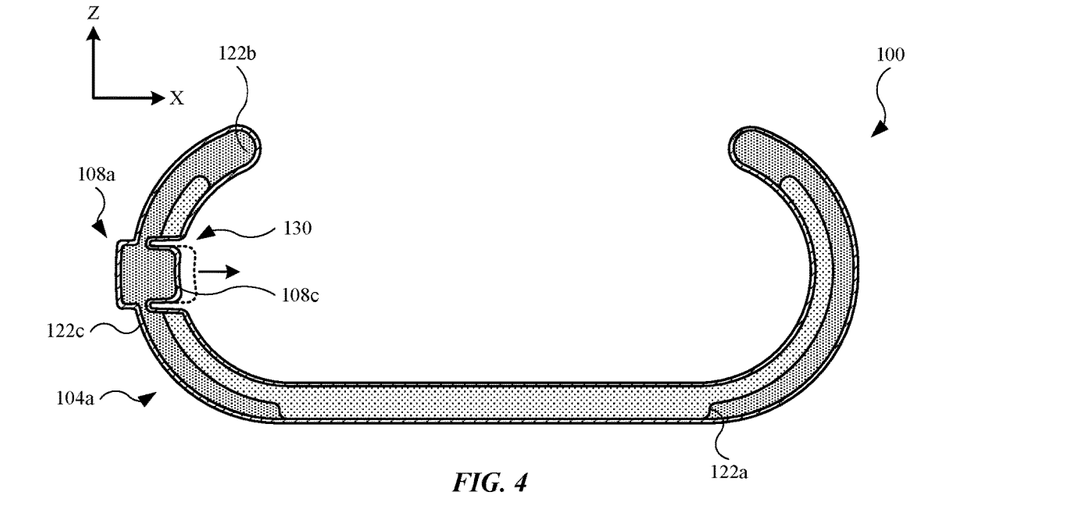
FIG. 4 illustrates a cross sectional view of the accessory device shown in FIG. 1, taken along line 4-4.

FIG. 4 illustrates a cross sectional view of the accessory device 100 shown in FIG. 1, taken along line 4-4. As shown, transparent material 122a may include a through hole 130. Also, the protrusion 108a is defined in part by the transparent material 122b and the transparent material 122c. The transparent material 122b may include additional material that defines a protrusion 108c that extends into the through hole 130, or at least partially into the through hole 130. The transparent material 122c also covers the protrusion 108c. When a force is applied to the protrusion 108a along the X-axis by, for example, a user depressing the protrusion 108a, the protrusion 108a and the protrusion 108c can move (as denoted by the arrow and the dotted lines) relative to the sidewall 104a, and in particular, can move relative to the transparent material 122a. Further, when an electronic device (not shown in FIG. 4) is positioned in the accessory device 100, the relative movement causes the protrusion 108c to depress a button (not shown in FIG. 4) of the electronic device. In some instances, the protrusion 108c may engage a surface of the button of the electronic device prior to being depressed by a user.

Figure 5:
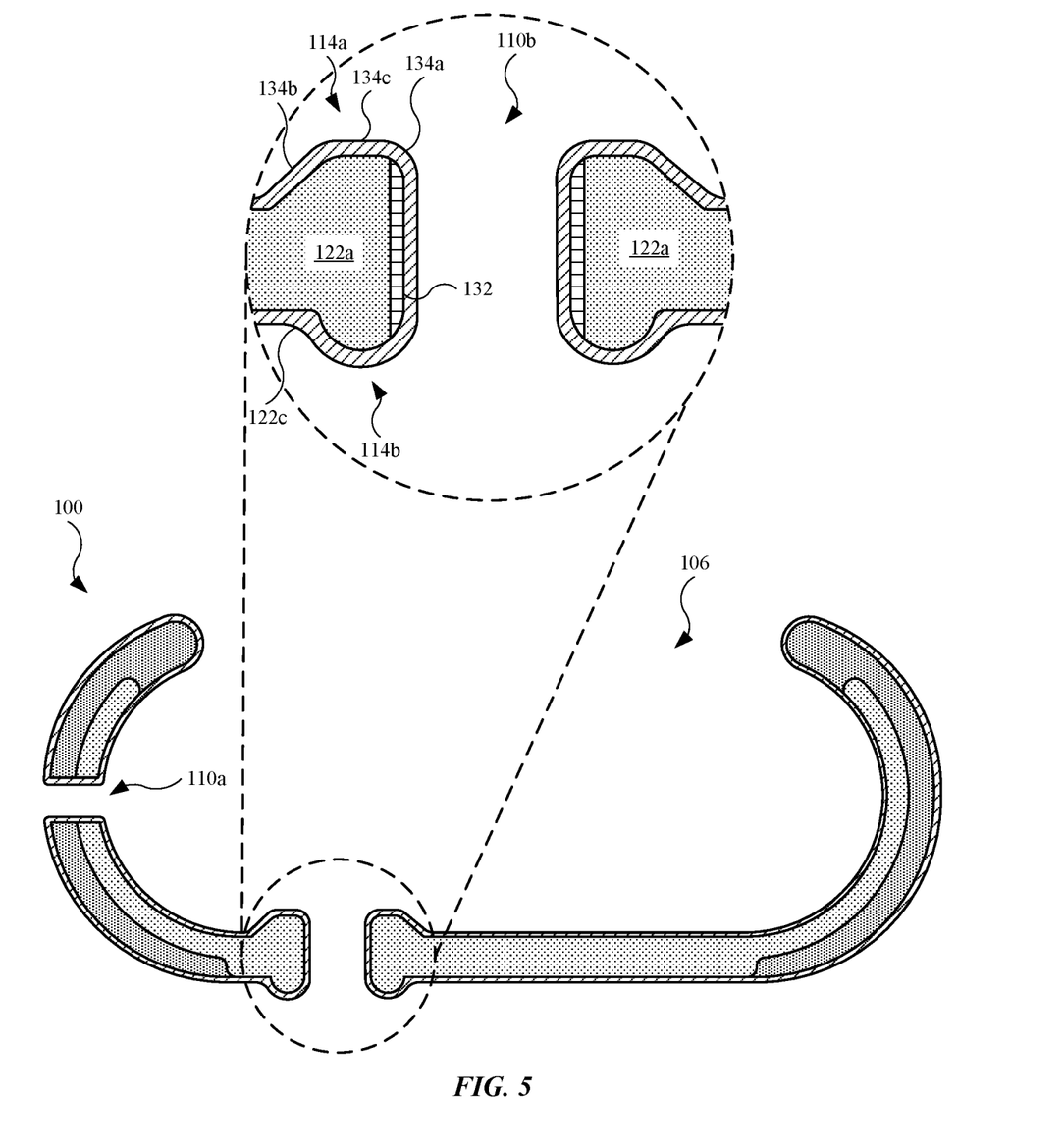
FIG. 5 illustrates a cross sectional view of the accessory device shown in FIG. 1, taken along line 5-5.

FIG. 5 illustrates a cross sectional view of the accessory device 100 shown in FIG. 1, taken along line 5-5. The through hole 110a is formed by an opening in the transparent material 122a, the transparent material 122b, and the transparent material 122c, while the through hole 110b is formed by an opening in the transparent material 122a and the transparent material 122c. Also, the transparent material 122c may be applied subsequent to forming the through hole 110a and the through hole 110b, thereby allowing for transparent material 122c to pass into the through hole 110a and the through hole 110b.

Prior to applying the transparent material 122c, a polishing operation may be applied to the transparent material 122a along a surface that defines the through hole 110b. For example, the polishing operation may alter a surface 132 of the transparent material 122a, shown in the enlarged view, such that light transmission increases through the surface 132. In other words, the light transmission capability of the transparent material 122a increases at the surface 132 of the transparent material 122a, as compared to remaining locations of the transparent material 122a. As a result, light generated from a flash module (not shown in FIG. 5) of the electronic device may readily enter the transparent material 122a at the surface 132. This will be shown below. It should be noted that the surface 132 may define a circumference around the through hole 110b. Also, the polishing operation may occur prior to applying the transparent material 122c.

The raised region 114a extends into an internal volume 106 of the accessory device 100. As a result, the raised region 114a may engage and support the electronic device (not shown in FIG. 5) when the electronic device is inserted into the internal volume 106 of the accessory device 100. The raised region 114a may include varying surface geometries. For example, the raised region 114a may include an edge 134a. The edge 134a may include a rounded edge that provides an aesthetic finish along the through hole 110b. The raised region 114a may further include an edge 134b. The edge 134b may include a chamfered edge that promotes insertion of an electronic device into the accessory device 100. Rather than a perpendicular edge, the edge 134b defines an inclined surface such that a portion of the electronic device, including a camera assembly or a turret of the camera assembly, does not get caught on the edge 134b during insertion. The raised region 114a may further include a surface 134c between the edge 134a and the edge 134b. The surface 134c may include a flat, or planar, surface that can engage an electronic device. It should be noted that the edge 134a, the edge 134b, and the surface 134c may extend around the through hole 110b. The raised region 114b, which extends away from the internal volume 106, may provide additional material around the through hole 110b to protect the camera. The raised region 114a and the raised region 114b ensure that the camera does not extend out of the through hole 110b and beyond the raised region 114b.

Figure 6:
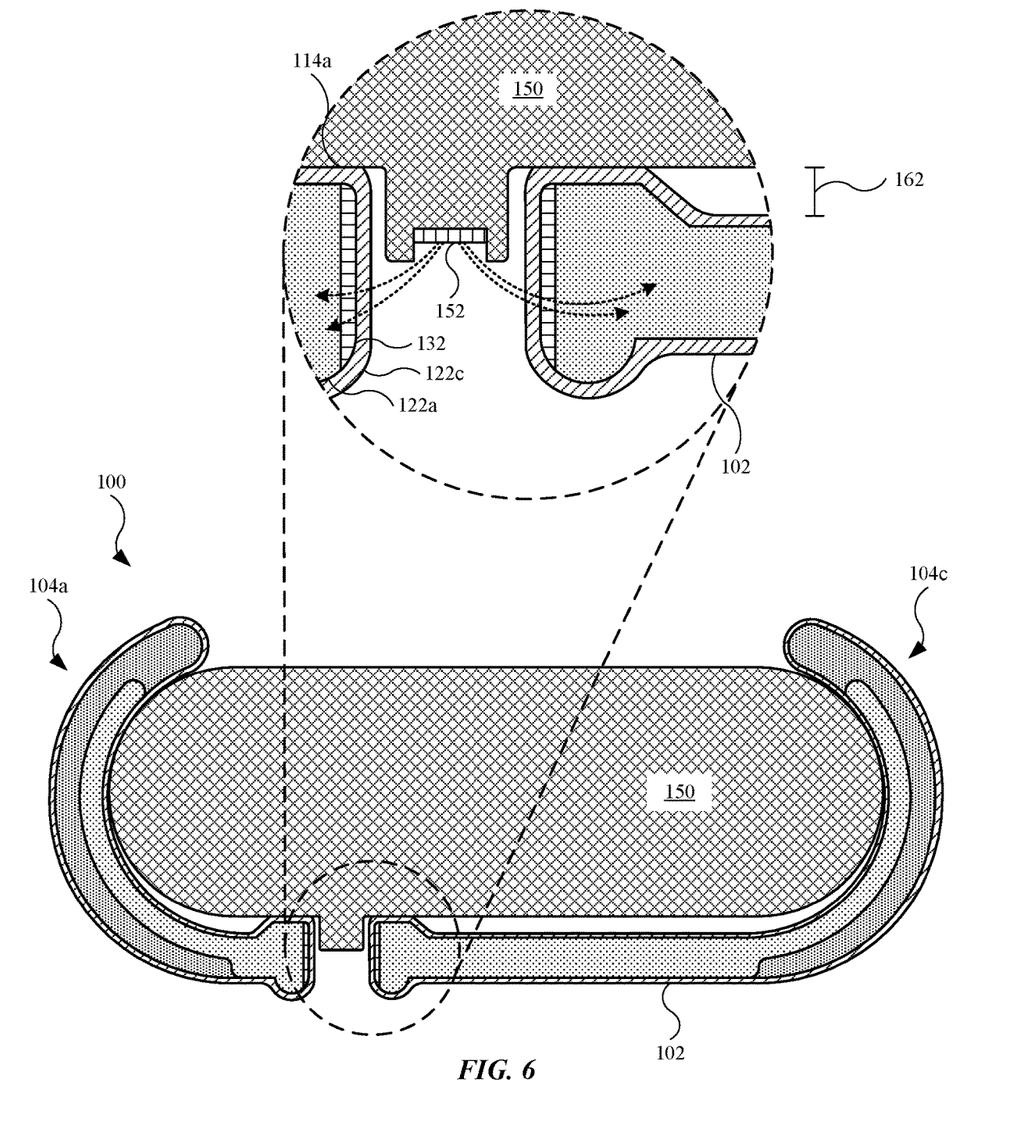
FIG. 6 illustrates a cross sectional view of the accessory device, showing an electronic device positioned in the accessory device.

FIG. 6 illustrates a cross sectional view of the accessory device 100, showing an electronic device 150 positioned in the accessory device 100, accordance with some described embodiments. The electronic device 150 may include a mobile wireless communication device, such as a smartphone or a tablet computer device. Although not shown, the electronic device may include a housing, a display assembly (including touchscreen capabilities), processor circuits, memory circuits, batteries, switches, buttons, as non-limiting example, in accordance with mobile wireless communication devices known in the art.

As shown in the enlarged view, the electronic device 150 rests on the raised region 114a. The electronic device 150 includes a flash module 152, which may be positioned next to a camera module (not shown FIG. 6). During an image capture event by the camera module, the flash module 152 emits light (shown as dotted lines with arrows) to enhance the image captured by the camera module. Due in part to the transparent material 122a undergoing a polishing operation that forms the surface 132, light emitted from the flash module 152 passes through the transparent material 122c, the surface 132, and the transparent material 122a. As a result, substantially less light, if any, reflects back into the camera module.

Also, a separation 162, or gap, may form between the electronic device 150 and the wall 102. The separation 162 may include a dimension approximately in the range of 0.1 to 0.5 mm. In some embodiments, the separation 162 defines a dimension of 0.3 mm. The raised region 114a may at least partially define the separation 162. Also, the separation 162 may be due in part to the size of the accessory device 100. For example, the sidewalls (such as the sidewall 104a and the sidewall 104c) of the accessory device 100 engage and provide a compression force to the electronic device 150 such that the electronic device 150 does not engage the wall 102. Accordingly, both the raised region 114a and the sidewalls may facilitate and maintain the separation 162 between the electronic device 150 and the wall 102.

Figure 7:
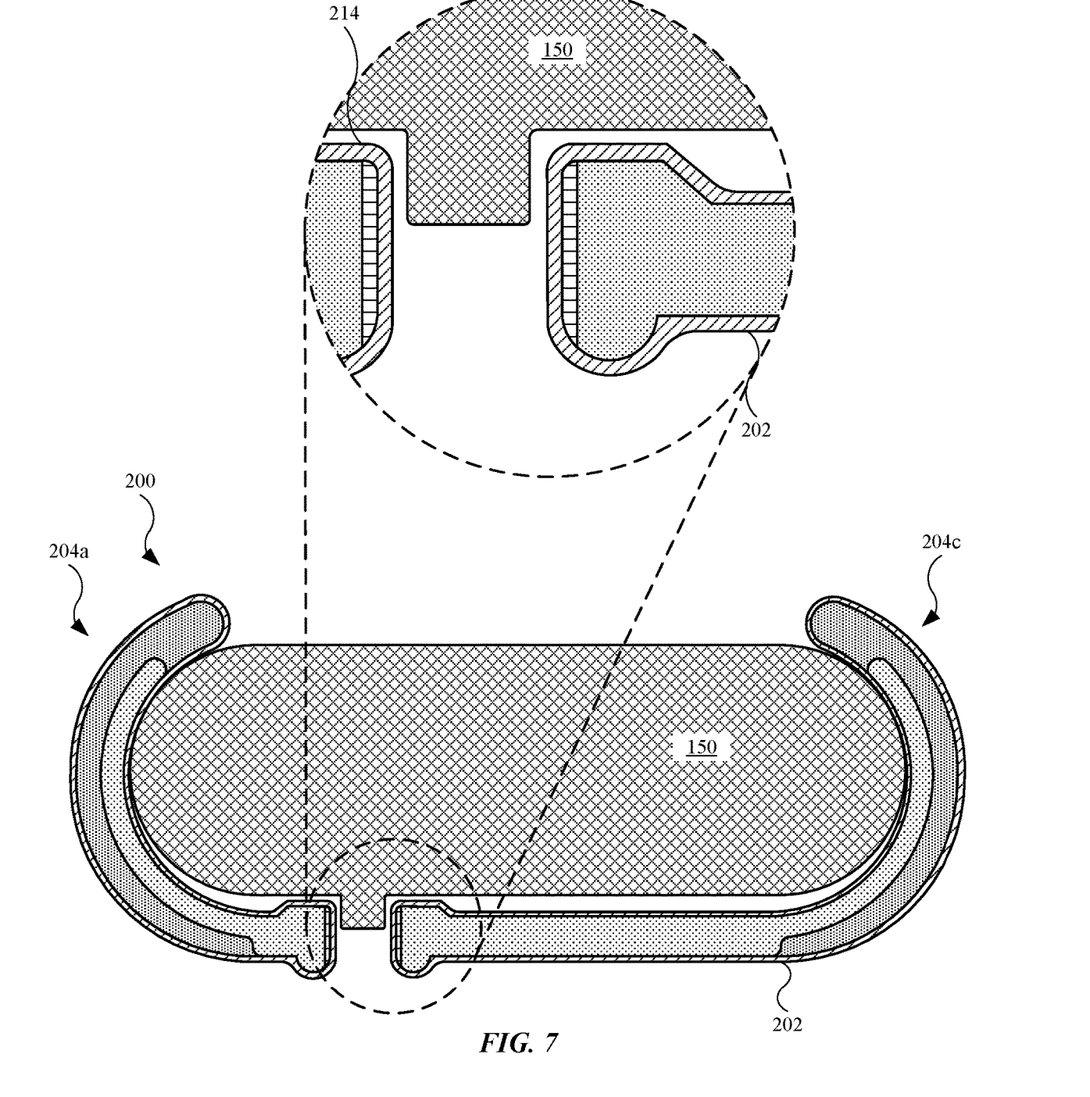
FIG. 7 illustrates a cross sectional view of an alternate embodiment of an accessory device, showing an electronic device positioned in the accessory device and free of contact with the wall and a raised region that extends from the wall, in accordance with some described embodiments.

FIG. 7 illustrates a cross sectional view of an alternate embodiment of an accessory device 200, showing an electronic device 150 positioned in the accessory device 200 and free of contact with a wall 202 and a raised region 214 that extends from the wall 202, in accordance with some described embodiments. The accessory device 200 may include several features described herein for an accessory device. As shown, the electronic device 150 is separated from the wall 202 and the raised region 214. This may be due in part to the sidewalls (such as a sidewall 204a and a sidewall 204c of the accessory device 200) being closer to the electronic device 150 (as compared to the sidewall 104a and the sidewall 104c in FIG. 6), thereby providing additional compression forces. Alternatively, or in combination, the raised region 214 may include a reduced dimension as compared to the raised region 114a (shown in FIG. 6).

Figure 8:
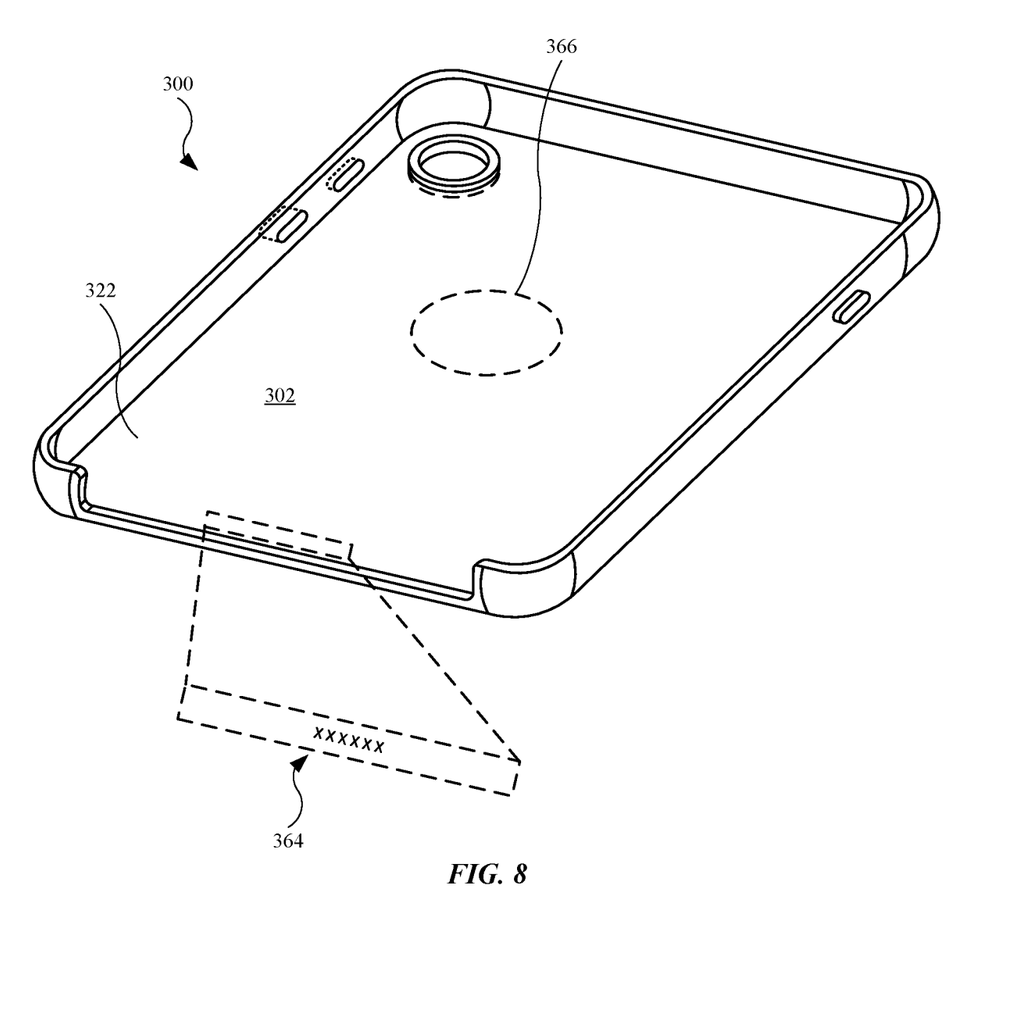
FIG. 8 illustrates an alternate embodiment of an accessory device, showing additional features, in accordance with some described embodiments.

FIG. 8 illustrates an alternate embodiment of an accessory device 300, showing additional features, in accordance with some described embodiments. The accessory device 300 may include several features described herein for an accessory device. As shown, the accessory device 300 includes a wall 302. As shown in the enlarged view, the accessory device 300 may include a pattern 364. The pattern 364 may include a pattern that is laser etched into the wall 302, as a non-limiting example. The pattern 364 may include a serial number related to the accessory device 300. The accessory device 300 may include multiple transparent materials, similar to the accessory device 100 (shown in FIGS. 1-6). For example, the accessory device 300 may include a transparent material 322 similar to the transparent material 122c (shown in FIG. 3) that covers the pattern 364, in addition to providing residue-resistant properties. The pattern 364 may be inscribed into the wall 302 prior to applying the transparent material 322.

The accessory device 300 may further include an indicium 366 embedded in the wall 302. The indicium 366 may include a logo, a letter, and/or a symbol, as non-limiting examples. The indicium 366 may also be embedded prior to applying the transparent material 322. It should be noted that the accessory device 100 (shown in FIG. 1) may include several features shown and described for the accessory device 200 (shown in FIG. 7) and/or the accessory device 300 (shown in FIG. 8). Likewise, the accessory device 200 and the accessory device 300 may include features shown and described for the accessory device 100 (shown in FIGS. 1-6).

Figure 9:
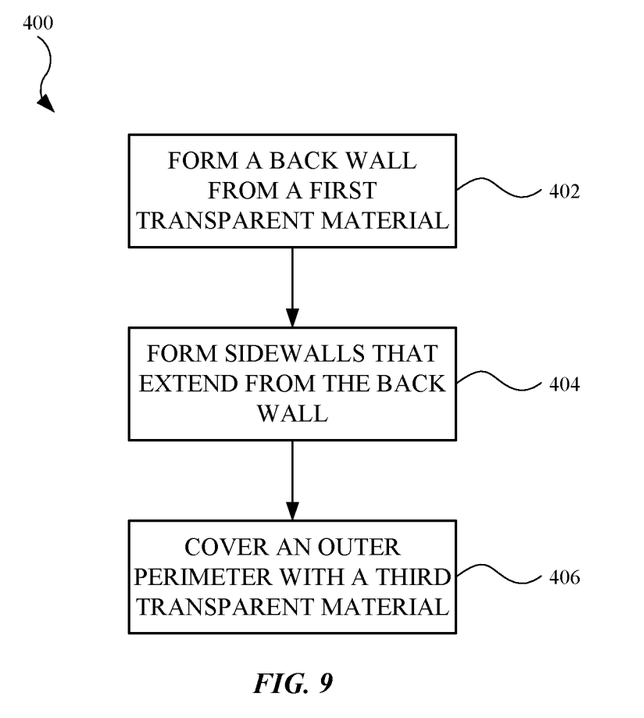
FIG. 9 illustrates a flowchart showing a method for forming an accessory device for an electronic device, in accordance with some described embodiments.

FIG. 9 illustrates a flowchart 400 showing a method for forming an accessory device for an electronic device, in accordance with some described embodiments. The accessory device formed using the method described by the flowchart 400 may be implemented to create any of the accessory devices described herein.

In step 402, a back wall is formed from a first transparent material. The operation to form the back wall may be performed by a molding operation, such as injection molding or compression molding. Also, the first transparent material may include a transparent polycarbonate material.

In step 404, several sidewalls are formed that extend from the back wall. The sidewalls may be formed from the first transparent material and a second transparent material different from the first transparent material. The second transparent material may include a transparent thermoplastic polyurethane. Also, the second transparent material may be applied to the first transparent material through one of the aforementioned molding operations, or through an overmolding operation.

In step 406, an outer perimeter of the accessory device is covered with a third transparent material. Prior to applying the third transparent material, the outer perimeter may be defined by first transparent material and the second transparent material. In some instances, the back wall and the sidewalls define the outer perimeter. The third transparent material may include an UV-cured acrylic material. Also, the third transparent material may include an oleophobic material.

Several different processes shown and described for the accessory devices shown in FIGS. 1-8 may be incorporated into the flowchart 400 to form an accessory device. For example, an opening in the back wall may undergo a polishing operation to enhance light transmission properties. Also, a protrusion (or protrusions) may be formed to depress a button of the electronic device. These should be construed as non-limiting examples.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for an electronic device, the accessory device comprising:
    a back wall comprising a first transparent material, the back wall comprising:
        a first surface and a second surface opposite the first surface;
        a first through hole extending from the first surface to the second surface;
        a first raised region located on the first surface and surrounding the first through hole; and
        a second raised region located on the second surface and surrounding the first through hole; and
    a sidewall that extends from the back wall, the sidewall comprising:
        a second through hole formed in the first transparent material, and
        a second transparent material different from the first transparent material,
        wherein
        the second transparent material covers the through hole and defines a protrusion at a location corresponding to the through hole.

2. The accessory device of claim 1, wherein the first transparent material comprises a first rigidity, and wherein the second transparent material comprises a second rigidity less than the first rigidity.

3. The accessory device of claim 1, further comprising:
    an opening formed in the back wall; and
    a raised region that surrounds the opening, the raised region comprising:
        a rounded edge;
        a chamfered edge; and
        a flat surface between the rounded edge and the chamfered edge.

4. The accessory device of claim 1, further comprising a third transparent material, wherein the first transparent material and the second transparent material define an outer perimeter, and wherein the third transparent material covers the outer perimeter.

5. The accessory device of claim 1, wherein the first transparent material comprises a first thickness along the back wall, and wherein the first transparent material comprises a second thickness along the sidewall, the second thickness less than the first thickness.

6. The accessory device of claim 1, wherein the first transparent material comprises a polycarbonate, and wherein the second transparent material comprises a thermoplastic polyurethane.

7. The accessory device of claim 1, wherein the back wall and the sidewall define an internal volume, and wherein when the electronic device is positioned in the internal volume, the sidewall engage the electronic device such that a gap forms between the back wall and the electronic device.

8. The accessory device of claim 1, wherein the first through hole includes a polished surface configured to permit passage of light.

9. The accessory device of claim 1, wherein the first through hole includes size and shape to receive a camera assembly.

10. A method for forming an accessory device for an electronic device, the method comprising:
  forming a back wall from a first transparent material;
  forming a through hole in the first transparent material along the back wall;
  forming a first raised region on a first surface of the back wall, the first raised region surrounding the through hole;
  forming a second raised region on a second surface of the back wall that is opposite the first surface, the second raised region surrounding the through hole;
  forming sidewalls that extend from the back wall, the sidewalls formed from the first transparent material and a second transparent material different from the first transparent material; and
  covering an outer perimeter with a third transparent material, wherein the back wall and the sidewalls define the outer perimeter.

11. The method of claim 10, further comprising:
  forming a through hole in the first transparent material along a sidewall of the sidewalls; and
  covering the through hole with the second transparent material.

12. The method of claim 10, further comprising polishing, prior to covering the outer perimeter with the third transparent material, a surface that defines the through hole.

\* \* \* \* \*